United States Patent
Lutchansky

[15] 3,698,816
[45] Oct. 17, 1972

[54] LASER GUIDANCE SYSTEM

[72] Inventor: Milton Lutchansky, Randolph Township, Morris County, N.J.

[73] Assignee: Bell Telephone Laboratories, Incorporated, Murray Hill, Berkeley Heights, N.J.

[22] Filed: Sept. 16, 1970

[21] Appl. No.: 72,749

[52] U.S. Cl. ............356/152, 343/106 R, 343/112 R, 340/27 NA
[51] Int. Cl. ............................G01s 1/44, G01s 3/02
[58] Field of Search.... 356/152; 343/106 R, 102, 112 R; 340/27 NA

[56] References Cited
UNITED STATES PATENTS

| 1,615,712 | 1/1927 | Loth | 343/103 |
| 1,968,085 | 7/1934 | Loth | 343/106 R |
| 2,257,320 | 9/1941 | Williams | 343/106 R |

*Primary Examiner*—Benjamin A. Borchelt
*Assistant Examiner*—S. C. Buczinski
*Attorney*—R. J. Guenther and Edwin B. Cave

[57] ABSTRACT

A laser guidance system utilizes two synchronized rotating laser beacons to generate desired two and three-dimensional reference curves in space. The orientation of one beacon is a prescribed function of the orientation of the other beacon and a reference curve is traced out in space as the loci of intersections of the rotating beacons. The intersections are detected so that the reference curve can be followed.

1 Claim, 4 Drawing Figures

LASER GUIDANCE SYSTEM

BACKGROUND OF THE INVENTION

1. Field of the Invention

This invention relates to guidance systems and more particularly to a guidance system utilizing a plurality of laser beacons to generate guidance or reference curves which may be detected and followed in space.

2. Description of the Prior Art

The increasing demand for communications facilities has made the use of a broadband waveguide transmission system appear increasingly attractive. The configuration of of the waveguide for such a system will have to be tightly controlled to prevent unacceptable degradation in the transmission. For example, the curvatures in the waveguide must be minimized and any required curvatures must be along curves which have substantial radii and are smooth. Since the waveguide for a waveguide transmission system will probably be buried, control over the contour of the waveguide will require control over the burial path. Standard surveying equipment is too slow and inefficient to be used in such operations.

Laser reference systems have been previously used in surveying applications and for elevation control in laying drainage tile. In such applications, a single laser source is used to establish a straight reference line or a reference plane. However, a straight line or a plane is not sufficient in waveguide installations where control in both plan and elevation is required and where bends must be negotiated along smooth curves having substantial radii. Two and three-dimensional reference curves are required for such applications.

Accordingly, it is an object of this invention to provide a guidance system for generating two and three-dimensional reference or guidance curves in space.

Another object is to provide a guidance system for automatically guiding apparatus along a desired reference curve.

A more specific object is to provide a guidance system which furnishes both plan and elevation control for trenching equipment and the like.

SUMMARY OF THE INVENTION

The foregoing objects and others are achieved in accordance with the principles of this invention by a guidance system which utilizes two synchronized rotating laser beacons to generate desired reference curves which may be used to direct apparatus along a desired path through space. The orientation of one beacon is at all times a prescribed function of the orientation of the second beacon. The loci of intersections of the beacons define a reference curve in space. These intersections may be detected by a suitable detector which is mounted on the apparatus to be guided and utilized to direct the subject apparatus along the reference curve. Different reference curves are defined by changing the functional relationship between the orientations of the two beacons. Single axis rotation of the beacons is sufficient to define two-dimensional reference curves and two axes rotation is required to define three-dimensional reference curves.

DESCRIPTION OF THE DRAWING

The invention will be more fully comprehended from the following detailed description and accompanying drawing in which.

DETAILED DESCRIPTION

Figure 1:
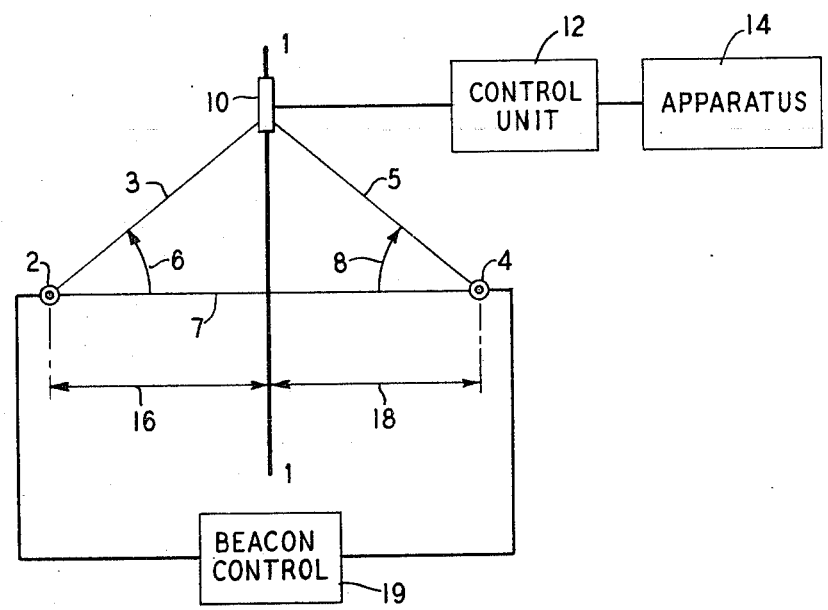
FIG. 1 is a schematic representation of one embodiment of a guidance system of this invention for generating a straight line reference.

FIG. 1 illustrates the use of the laser guidance system of this invention for generating a straight line reference. As has been previously mentioned, a straight line reference can be generated by a single laser beacon. Thus, the instant guidance system might not be utilized if only straight line references were needed. However, since there will be many situations in which both straight line references and curved references are needed, this embodiment of the invention is discussed in detail.

The guidance system of FIG. 1 comprises two continuously rotating laser beacons 2 and 4 spaced on opposite sides of a desired straight line reference 1—1. The distances 16 and 18 by which beacons 2 and 4, respectively, are spaced from reference 1—1 are equal. The directions of rotation of beacons 2 and 4 are indicated by the arrows on the arcs defining angles 6 and 8, respectively. Other directions of rotation are also possible as will subsequently become apparent. The plane of rotation of beacons 2 and 4 advantageously can be in the same plane as reference 1—1. However, other planes of rotation which are parallel to the reference 1—1 are acceptable.

Rotating laser beacons 2 and 4 are synchronized and controlled by beacon control unit 19 by methods well known in the art, such as by utilizing accurate stepping motors triggered by a common timing signal. The orientation of one beacon is at all times a function of the orientation of the other beacon. Angles 6 and 8 define the angular orientation of beams 3 and 5, respectively, from beacons 2 and 4, respectively, with respect to reference line 7 which connects beacons 2 and 4 and is normal to reference line 1—1. In this situation the beacons are synchronized so that angle 6 equals angle 8 at all times.

As beacons 2 and 4 rotate, beams 3 and 5 sweep across a detector 10 which comprises a plurality of light beam detectors well known in the art. These light beam detectors are arranged to generate signals which are proportional to the deviation of the intersection of the laser beams from the surface of detector 10. The outputs from the individual detectors can be combined by simple arithmetic circuits to generate the correct signals indicating the deviation of the beam intersection from the detector surface. If detector 10 is on reference 1—1, beams 3 and 5 will sweep across detector 10 simultaneously. If detector 10 is to the left of reference 1—1, beam 3 trails beam 5 in sweeping across detector 10. If detector 10 is to the right of reference 1—1, beam 5 trails beam 3. The height at which beams 3 and 5 sweep across detector 10 determines the vertical deviation from the plane of reference 1—1. Detector 10 will normally be rigidly mounted to apparatus 14 and thus the signals generated by detector 10 will be directly related to the position of apparatus 14 with respect to the desired reference path.

The signals from detector 10 are fed to control unit 12 which generates the proper control signals for directing apparatus 14 into the desired relationship with reference 1—1. Apparatus suitable for control unit 12 is known in the art. In FIG. 1 beams 3 and 5 sweep across opposite sides of detector 10. However, if detector 10 is rotated 90°, the beams will sweep in opposite directions across the same side of detector 10. Here the signals to control unit 12 will be determined by the deviation of the intersection of the beams from some reference point on detector 10. Other orientations for detector 10 could be utilized. Also the direction of rotation of beacons 2 and 4 could be varied and other functional relationships between the orientation of these beacons could be provided such that a straight line reference could still be obtained. The guidance system of FIG. 1 generates or traces straight line reference 1—1 on each revolution of beacons 2 and 4. The reference 1—1 can be used by any number of apparatuses which need to be directed along the same path.

Figure 2:
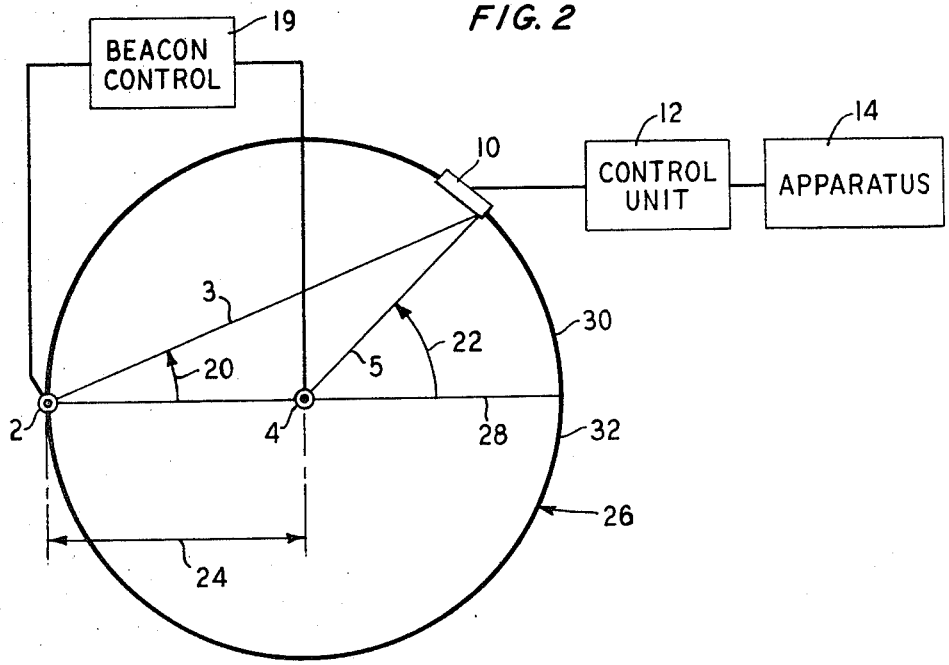
FIG. 2 is a schematic representation of another embodiment of a guidance system for generating planar reference curves.

As previously mentioned, it is necessary that any required changes of direction in a waveguide system be accomplished along a smooth curve, which will normally be the arc of a circle, having a substantial radius. FIG. 2 illustrates a laser guidance system for directing apparatus 14 along a circle 26 or arc thereof. To generate reference curve 26 beacons 2 and 4 are separated by a distance 24 which equals the radius of the desired reference curve 26. With respect to reference line 28, which is a line connecting beacons 2 and 4, the orientation angle 20 of beam 3 from beacon 2 is prescribed as one-half of the orientation angle 22 of beam 5 from beacon 4. With this functional relationship between angles 20 and 22, beams 3 and 5 will sweep across the same side of detector 10 simultaneously as long as detector 10 remains on reference curve 26. If detector 10 deviates from reference curve 26 because of deviation by apparatus 14 from the desired path of travel, beam 3 or 5 will sweep first across detector 10 depending upon whether detector 10 is inside or outside reference curve 26, respectively. Accordingly, the signals from detector 10 are utilized by control unit 12 to correct the path of travel of apparatus 14.

The entire reference curve 26 is generated on every two revolutions of beacon 4 and thus on every revolution of beacon 2. The top half 30 of curve 26 is generated in the first 180° of the first revolution of beacon 4 and the bottom half 32 is generated in the last 180° of the second revolution of beacon 4. Any number of different apparatuses can be guided simultaneously along reference curve 26 by the two beacons 2 and 4.

Figure 3:
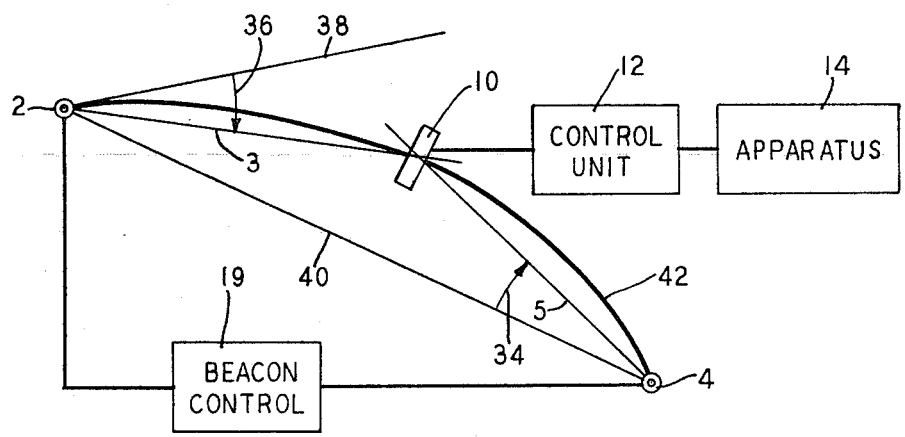
FIG. 3 is a schematic representation of another embodiment of the invention for generating a planar reference curve by a second method.

FIG. 3 illustrates another embodiment of the guidance system for guiding apparatus 14 along the arc of a circle 42. This embodiment advantageously can be used where it is desired to keep both the laser guidance equipment and the guided apparatus within narrow boundaries such as a narrow right-of-way. Beacons 2 and 4 are installed at two points along arc 42 along which apparatus 14 is to be directed. Reference line 38 is the tangent to arc 42 at beacon 2 and reference line 40 is the chord connecting beacons 2 and 4. The orientation angle 36 of beam 3 from beacon 2 with respect to reference 38 is prescribed to be equal to orientation angle 34 of beam 5 from beacon 4 with respect to reference 40. Under such conditions, beams 3 and 5 sweep in opposite directions across opposite sides of detector 10 which is mounted substantially perpendicular to arc 42. If detector 10 is located on arc 42, beams 3 and 5 will intersect at a prescribed reference point on detector 10. The distance and direction of any deviation of the intersection of beams 3 and 5 from the prescribed reference point is proportional to the deviation of detector 10 from arc 42 and correspondingly the deviation of apparatus 14 from the desired path of travel. Accordingly, the signals from detector 10 can be utilized by control unit 12 to control apparatus 14.

In the system of FIG. 3, beacons 2 and 4 may be controlled to oscillate back and forth through limited angles which encompass arc 42 rather than performing complete revolutions. In such case, lower angular velocities of beacons 2 and 4 could be utilized.

Figure 4:
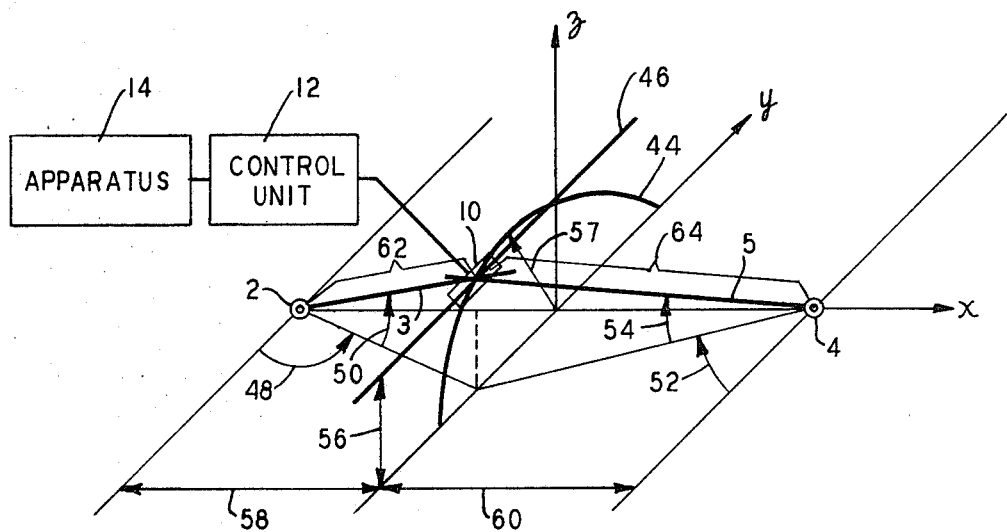
FIG. 4 is a schematic representation of a further embodiment of the guidance system for generating a straight line reference or a planar reference curve.

FIG. 4 illustrates a more general embodiment of the invention for generating planar reference curves and straight line reference which requires rotations of beacons 2 and 4 about two axes. Beacons 2 and 4 are located on opposite sides of a vertical plane y-z in which it is desired to generate a reference curve 44 or a straight line reference 46. Any position along reference curve 44 or straight line reference 46, such as the position of detector 10, can be defined with respect to beacon 2 by geometrical relationships between distance 62 and angles 48 and 50. Likewise, the same position can be defined with respect to beacon 4 by geometrical relationships between distance 64 and angles 52 and 54. Distance 56, 57, 58, and 60 are known by reason of the parameters of reference path 44 and 46 and the position parameters of beacons 2 and 4. Thus, the orientation of beacon 2, which is required for beams 3 and 5 to intersect at detector 10, readily can be expressed as a function of the orientation of beacon 4. Therefore, beacons 2 and 4 can be synchronized so that beams 3 and 5 intersect along a desired reference path. As previously discussed, these intersections can be detected by detector 10 which generates signals utilized by control unit 12 to direct apparatus 14 with respect to the reference path.

In many applications, two-dimensional or planar reference curves only will be required. For example, if curvature of a waveguide system is restricted to a single plane at a time, the previously described guidance systems wherein beacons 2 and 4 rotate about a single axis would be adequate. A guidance system such as illustrated in FIG. 2 could be used in one orientation to trace out reference curves in a horizontal plane. The system could then be rotated 90 degrees to trace out reference curves in a vertical plane which would provide for changes in burial depth, terrain contour, and the like. Alternatively, a system such as illustrated in FIG. 4 could be used to trace out curves in either a horizontal or a vertical plane. Curves in a horizontal plane are obtained by the system of FIG. 4 by restricting beacons 2 and 4 to single axis rotation about axes parallel to the z axis. The system is then reverted to two-axis rotation as described with respect to FIG. 4 to trace out vertical planar curves.

The previously described embodiments of the laser guidance system have involved two-dimensional reference curves, but the principles disclosed therein are easily extended to three-dimensional reference curves. Three-dimensional reference curves require rotation about two axes. However, such rotation was utilized in conjunction with the guidance system of FIG. 4 to generate two-dimensional reference curves.

A guidance system basically similar to that illustrated in FIG. 4 can be used to generate three-dimensional reference curves. In the generation of two-dimensional reference curves as shown in FIG. 4, distances 62 and 64 and angles 48, 50, 52, and 54 vary while distances 56, 57, 58, and 60 remain constant. In the generation of three-dimensional reference curves, distances 56, 57, 58, and 60 would also vary. Thus, the geometrical expressions which would define any point along a desired three-dimensional reference curve with respect to beacons 2 and 4 will be more complex than such expression for a two-dimensional reference curve. However, these geometrical expressions can be obtained for the three-dimensional case. By combining the expressions for beacons 2 and 4 and eliminating parameters, the orientation of beacon 2, which is required for beams 3 and 5 to intersect and trace the reference path, can be expressed as a function of the orientation of beacon 4 just as is done in the two-dimensional case. Beacons 2 and 4 can then be synchronized to carry out the prescribed function relationship and thereby cause beams 3 and 5 to intersect and trace the desired three-dimensional reference curve.

Basically, there is no limitation on the ability to trace an arbitrary reference curve in space as the loci of intersections of laser beams 3 and 5. As long as the desired relationship between the orientations of the two beacons 2 and 4 can be defined and beacons 2 and 4 synchronized to carry out this relationship, the loci of intersections of beams 3 and 5 will trace out the desired reference curve.

While the invention has been described with respect to specific embodiments thereof, it is to be understood that various modifications thereto and uses thereof might be made by those skilled in the art without departing from the spirit and scope of the following claims.

What is claimed is:

1. A laser guidance system for directing apparatus along a prescribed three-dimensional reference path comprising, in combination:

means including first and second laser beacons, each having two orthogonal axes of rotation, for directing laser beams from said beacons along said three-dimensional path;

means for controlling the rotation of said beacons about respective axes, the rotation of said second beacon being a continuous prescribed function of the rotation of said first beacon, said function being determined by the location of said beacons with respect to said three-dimensional path, said beams intersecting along said three-dimensional path, said path being defined by the loci of intersections of said beams as said beacons rotate;

means for detecting said intersections and generating signals which are a measure of the position of said apparatus with respect to said three-dimensional reference path; and control means for utilizing said signals to direct said apparatus along said reference path.

* * * * *